(12) United States Patent
Hashiguchi et al.

(10) Patent No.: US 9,242,371 B2
(45) Date of Patent: Jan. 26, 2016

(54) ROBOT SYSTEM, ROBOT MANAGEMENT COMPUTER FOR A ROBOT SYSTEM, AND METHOD OF MANAGING A ROBOT SYSTEM

(71) Applicant: Kabushiki Kaisha Yaskawa Denki, Kitakyushu-shi (JP)

(72) Inventors: Yukio Hashiguchi, Kitakyushu (JP); Shinji Murai, Kitakyushu (JP); Tomoyuki Shiraki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/340,495

(22) Filed: Jul. 24, 2014

(65) Prior Publication Data

US 2015/0032257 A1    Jan. 29, 2015

(30) Foreign Application Priority Data

Jul. 26, 2013    (JP) .................................. 2013-156185

(51) Int. Cl.
  *G05B 19/418*    (2006.01)
  *B25J 9/06*    (2006.01)
  *B25J 9/16*    (2006.01)

(52) U.S. Cl.
  CPC  *B25J 9/06* (2013.01); *B25J 9/1674* (2013.01); *G05B 19/4184* (2013.01); *G05B 2219/39135* (2013.01); *G05B 2219/40224* (2013.01); *G05B 2219/50118* (2013.01)

(58) Field of Classification Search
  USPC ......... 700/248, 245, 247, 249, 250, 254, 246; 340/686.6, 686.1, 540; 356/614, 686.6; 701/400, 408
  See application file for complete search history.

(56) References Cited

U.S. PATENT DOCUMENTS

| 6,463,360 | B1 | 10/2002 | Terada et al. |
| 8,989,897 | B2* | 3/2015 | de Smet ........................ 700/245 |
| 2006/0009878 | A1 | 1/2006 | Kobayashi et al. |
| 2010/0211220 | A1 | 8/2010 | Nishi et al. |

(Continued)

FOREIGN PATENT DOCUMENTS

| CN | 100408277 C | 8/2008 |
| CN | 102317044 A | 1/2012 |

(Continued)

OTHER PUBLICATIONS

European Search Report for relating Patent Application No. EP14178118.7 dated Feb. 26, 2015.

(Continued)

*Primary Examiner* — Ronnie Mancho
(74) *Attorney, Agent, or Firm* — Hubbs, Enatsky & Inoue PLLC (57) ABSTRACT

To enable a recovery control program to be executed quickly by a robot controller without needing to equip the robot controller with a large-capacity storage device, provided is a robot system, including a first robot controller for controlling a first robot. The first robot controller includes a posture information obtaining unit for obtaining information indicating a posture of the first robot when an anomaly occurs in the first robot. The robot system further includes a recovery control program generating unit for generating, by computing, based on the posture of the first robot, a recovery control program for changing the posture of the first robot to a given standby posture.

5 Claims, 10 Drawing Sheets

(56) References Cited

U.S. PATENT DOCUMENTS

| | | | |
|---|---|---|---|
| 2011/0208355 A1* | 8/2011 | Tsusaka | 700/246 |
| 2011/0288667 A1 | 11/2011 | Noda et al. | |
| 2012/0002216 A1* | 1/2012 | Shibata et al. | 356/614 |
| 2012/0182155 A1* | 7/2012 | Sato et al. | 340/686.6 |

FOREIGN PATENT DOCUMENTS

| | | | |
|---|---|---|---|
| EP | 1625918 A2 | 2/2006 | |
| GB | 2239325 A | 6/1991 | |
| JP | H06-155252 A | 6/1994 | |
| JP | 2006-012074 A | 1/2006 | |
| JP | 2008-287665 A | 11/2008 | |

OTHER PUBLICATIONS

European Search Report for corresponding Patent Application No. EP14178119.5 dated Feb. 23, 2015.

European Search Report for relating Patent Application No. EP14178111.2 dated Feb. 11, 2015.

Partial translation of the office action for Japanese patent application No. 2013-156185 dated on Jun. 2, 2015.

The translation of OA for corresponding Chinese Patent Application No. 201410357099.0. dated Jul. 30, 2015.

* cited by examiner

| ROBOT ID | WORK ABILITY |
|---|---|
| 001 | ..... |
| 002 | ..... |
| 003 | ..... |

FIG.6

| ROBOT SET-UP LOCATION | NETWORK IDENTIFIER |
|---|---|
| L-1 | ............... |
| L-2 | ............... |
| L-3 | ............... |

FIG.7

| OPERATION CONTROL PROGRAM | REQUIRED WORK ABILITY |
|---|---|
| A | ..... |
| B | ..... |
| C | ..... |

FIG.8

| ROBOT SET-UP LOCATION | OPERATION CONTROL PROGRAM |
|---|---|
| L-1 | A |
| L-2 | B |
| L-3 | C |

FIG.9

| WORK PIECE ID | ROBOT ID | OPERATION SPECIFICS DATA |
|---|---|---|
| 1234567 | 001 | ····· |
| 1234568 | 002 | ····· |

ROBOT SYSTEM, ROBOT MANAGEMENT COMPUTER FOR A ROBOT SYSTEM, AND METHOD OF MANAGING A ROBOT SYSTEM

INCORPORATION BY REFERENCE

The present disclosure contains subject matter related to that disclosed in Japanese Priority Patent Application JP 2013-156185 filed in the Japan Patent Office on Jul. 26, 2013, the entire contents of which are hereby incorporated by reference.

BACKGROUND OF THE INVENTION

1. Field of the Invention

The present invention relates to a robot system, a robot management computer for a robot system, and a method of managing a robot system.

2. Description of the Related Art

Hitherto, industrial multi-articulated robots and other industrial robots are connected to a robot controller which is constructed mainly from a computer and which controls the operation of the robot. Specifically, the robot controller executes a robot operation control program also called a task, thereby transmitting various control commands to the robot from the robot controller. The robot performs a given operation under the commands.

SUMMARY OF THE INVENTION

According to one embodiment of the present invention, there is provided a robot system, including a first robot controller for controlling a first robot. The first robot controller includes a posture information obtaining unit for obtaining information indicating a posture of the first robot when an anomaly occurs in the first robot. The robot system further includes a recovery control program generating unit for generating, by computing, based on the posture of the first robot, a recovery control program for changing the posture of the first robot to a given standby posture.

Further, according to one embodiment of the present invention, there is provided a robot management computer, including: a posture information receiving unit for receiving information that indicates a posture of a robot from a robot controller which controls the robot, when an anomaly occurs in the robot; a recovery control program generating unit for generating, based on the posture of the robot, a recovery control program for changing the posture of the robot to a given standby posture; and a recovery control program transmitting unit for transmitting the generated recovery control program to the robot controller.

Further, according to one embodiment of the present invention, there is provided a method of managing a robot system, including: receiving information that indicates a posture of a robot from a robot controller which controls the robot, when an anomaly occurs in the robot; generating, based on the posture of the robot, a recovery control program for changing the posture of the robot to a given standby posture; and transmitting the generated recovery control program to the robot controller.

DESCRIPTION OF THE EMBODIMENTS

An embodiment of the present invention is described in detail below with reference to the drawings.

Figure 1:
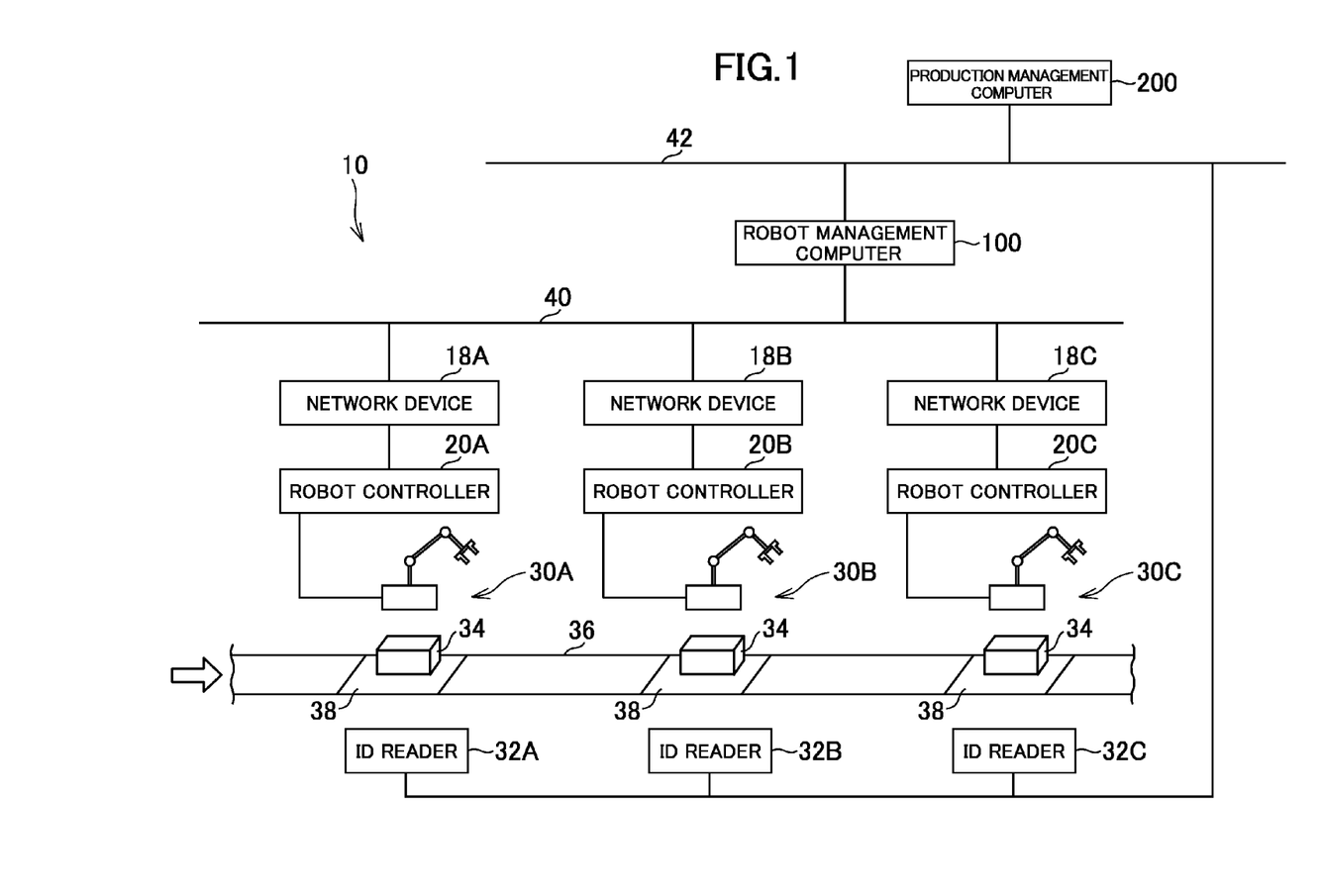
FIG. 1 is an overall configuration diagram of a robot system according to an embodiment of the present invention.

FIG. 1 is an overall configuration diagram of a robot system according to the embodiment of the present invention. The robot system of FIG. 1 which is denoted by 10 is setup in a manufacturing site of, for example, automobiles and other transportation machines or television receivers and other electric appliances. A conveying apparatus 36 such as a belt conveyor and a roller conveyor is set up in the manufacturing site to convey in one way a work piece 34, which is an unfinished automobile or television receiver and which is put on a work table 38 serving as a work space of robots. Industrial multi-articulated robots 30A, 30B, and 30C are arranged at intervals by the side of the conveying apparatus 36 from the upstream side to the downstream side in the order stated. These robots 30A, 30B, and 30C each perform predetermined work such as attaching parts on the work piece 34.

The robots 30A, 30B, and 30C are respectively connected to and controlled by robot controllers 20A, 20B, and 20C, which are computers. Network devices 18A, 18B, and 18C are connected to the robot controllers 20A, 20B, and 20C, respectively. The network devices 18A, 18B, and 18C are all connected to a robot network 40. A robot management computer 100 for assisting and managing the operation of the robot controllers 20A, 20B, and 20C is also connected to the robot network 40. The robot controllers 20A, 20B, and 20C can respectively hold communication via the network devices 18A, 18B, and 18C to and from the robot management computer 100 over the robot network 40. The network devices 18A, 18B, and 18B and the robot management computer 100 store addresses and other network identifiers in the robot network 40, and use the network identifiers to identify one another as the sender and destination of a transmission.

The conveying apparatus 36 brings each work table 38 to a stop by the side of where one of the robots 30A, 30B, and 30C is set up and, after the robot 30A, 30B, or 30C finishes working, moves the work table 38 to a position by the side of where the downstream robot is set up. The completion of work of the robots 30A, 30B, and 30C may be notified to the conveying apparatus 36 by the robot controllers 20A, 20B, and 20C, respectively.

Work piece ID readers 32A, 32B, and 32C are arranged on the side opposite from where the robots 30A, 30B, and 30C are set up across the conveying apparatus 36. To each work piece 34, or the work table 38 on which the work piece 34 is put, the ID (identification information) of the work piece 34 is attached in a machine-readable mode, for example, in the form of a one-dimensional or two-dimensional bar code. The ID of the work piece 34 can be, for example, a final or interim serial number or lot number. The work piece ID readers 32A, 32B, and 32C which are bar code readers or the like read an ID attached to the work piece 34 or the work table 38 and notify the read ID to a production management computer 200 via a production management network 42. In other words, the work piece ID readers 32A, 32B, and 32C and the production management computer 200 are connected to the production management network 42. The robot management computer 100 described above is connected to the production management network 42 as well so that communication can be held between the robot management computer 100 and the production management computer 200.

In the robot system 10 according to this embodiment, when the robot 30A is introduced or relocated, the robot 30A is arranged in a given set-up location, the robot controller 20A is connected to the network device 18A, and then the robot management computer 100 transmits an operation control program that is to be executed in the robot controller 20A to the robot controller 20A, thereby enabling the robot controller 20A to control the robot 30A to perform a given operation without fail. The same applies to the robots 30B and 30C. The industrial multi-articulated robots 30A, 30B, and 30C can handle various types of work by switching operation control programs. The use of the robots 30A, 30B, and 30C is therefore flexible, and the robots 30A, 30B, and 30C may be put to work at one place in the manufacturing site one day while put to different work at a different place in the manufacturing site another day. This embodiment, where the robot controllers 20A, 20B, and 20C are supplied with appropriate operation control programs suited to the set-up locations of the robots 30A, 30B, and 30C, promotes this use.

In the robot system 10 according to this embodiment, in the event of an anomaly in one of the robots 30A, 30B, and 30C, such as a gripping failure of a robot hand or other gripping means of the robot 30A, 30B, or 30C, the robot management computer 100 stops the other two robots out of the robots 30A, 30B, and 30C, and automatically generates, by computing, respective recovery control programs for putting the robots 30A, 30B, and 30C in a given standby posture in order. The robots 30A, 30B, and 30C in the standby posture are, for example, holding their arms close to their bases and apart from the conveying apparatus 36. Hitherto, it has been necessary to generate, in advance, many recovery control programs for bringing the robots in a posture to the given standby posture in association with every posture and store the programs in the robot controllers 20A, 20B, and 20C in order to ensure that the robots 30A, 30B, and 30C can return to the given standby posture no matter what posture the robots 30A, 30B, and 30C are in at the time of anomaly. The robot system 10 according to this embodiment, where the recovery control programs are generated by computing, eliminates this need.

The robot system 10 according to this embodiment includes the production management computer 200 to which the ID of each work piece 34 read by the work piece ID readers 32A, 32B, and 32C is transmitted. Also transmitted to the robot management computer 100 are pieces of operation specifics data, which are transmitted from the robot controllers 20A, 20B, and 20C and which indicate the IDs of the robots 30A, 30B, and 30C and the specifics of operations of the robots at work. The robot management computer 100 stores these pieces of data in association with the IDs of the work pieces 34, thereby recording what operation has specifically been performed on which work piece 34 by which robot. Information such as the fact that an additional force has been required when attaching a part to the work piece 34 due to a slight difference from the expected shape of the part can thus be obtained and put to use in production management.

Figure 2:
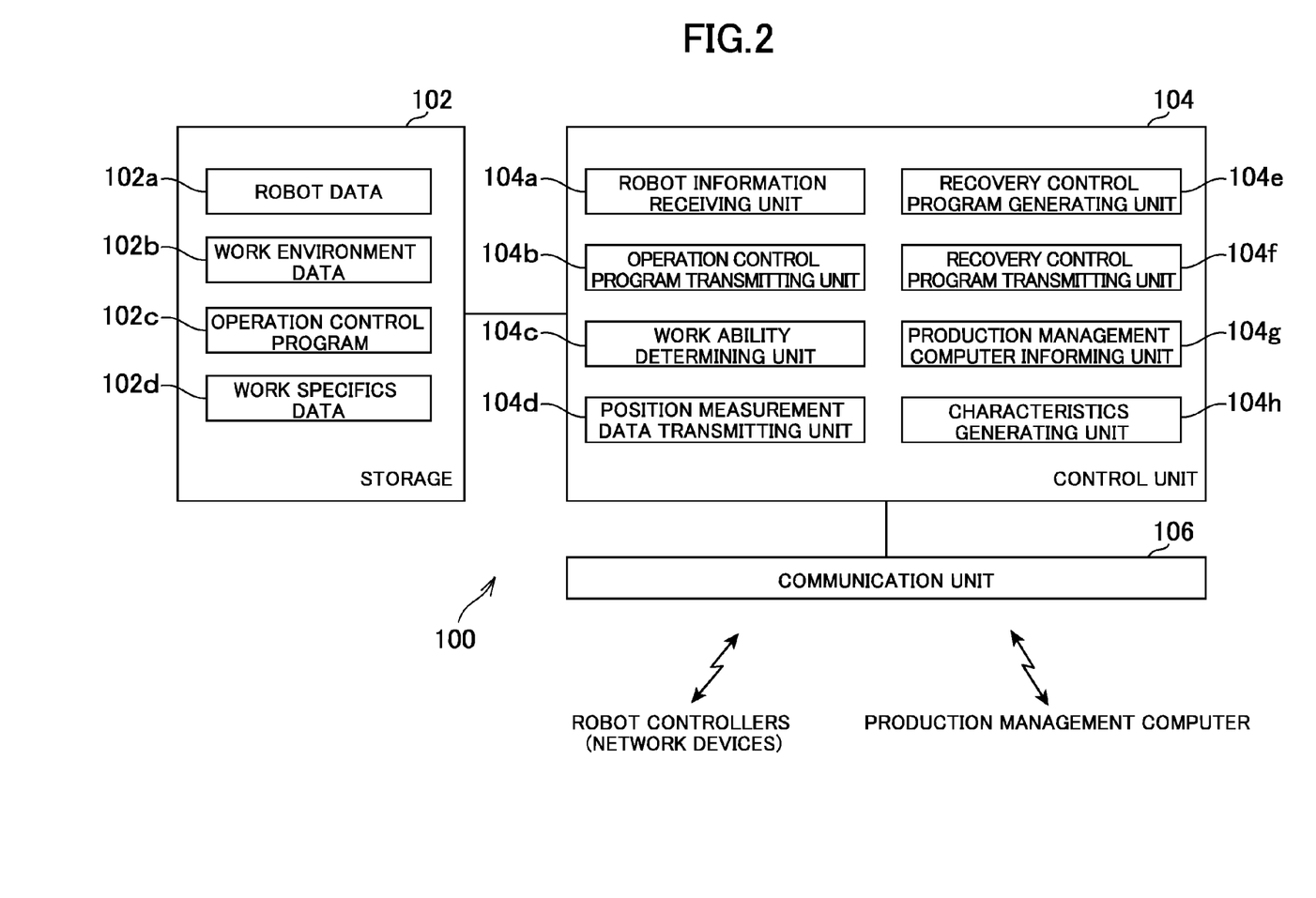
FIG. 2 is a configuration diagram of a robot management computer.

FIG. 2 is a configuration diagram of the robot management computer 100. The robot management computer 100 includes a storage 102, which is a hard disk, a semiconductor memory, and the like, a control unit 104, which has a CPU as a main component, and a communication unit 106, which is a network adapter or the like for holding communication to and from the robot controllers 20A, 20B, and 20C (the network devices 18A, 18B, and 18C) and the production management computer 200.

Figure 5:
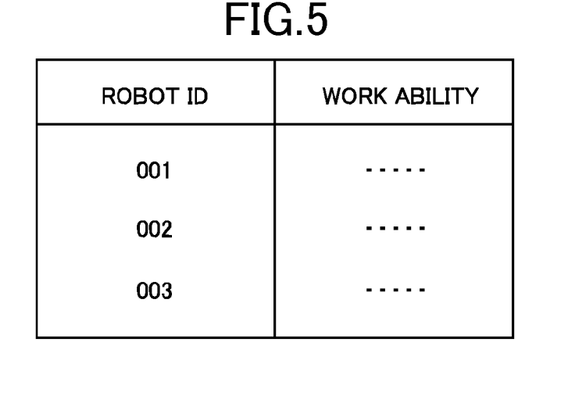
FIG. 5 is a table schematically showing an example of a robot work ability table.

A robot data area 102a, a work environment data area 102b, an operation control program area 102c, and a work specifics data area 120d are provided in the storage 102. The robot data area 102a stores three-dimensional model data that indicates the contour of the robots 30A, 30B, and 30C and a robot work ability table. The robot work ability table is a table in which, for each of the robots 30A, 30B, and 30C, the work ability of the robot is written in association with the ID of the robot as shown in FIG. 5. The work ability can be expressed by, for example, the type of a tool attached to the tip of an arm of the robot 30A, 30B, or 30C ("robot hand", "welding tool", or the like), the count of arms ("one arm" or "two arms"), the count of joints included in an arm, or the size or power of the robot 30A, 30B, or 30C. The work ability recorded in the robot work ability table may include information that indicates the product type of the robot 30A, 30B, or 30C which is identified by a robot ID, for example.

Figure 6:
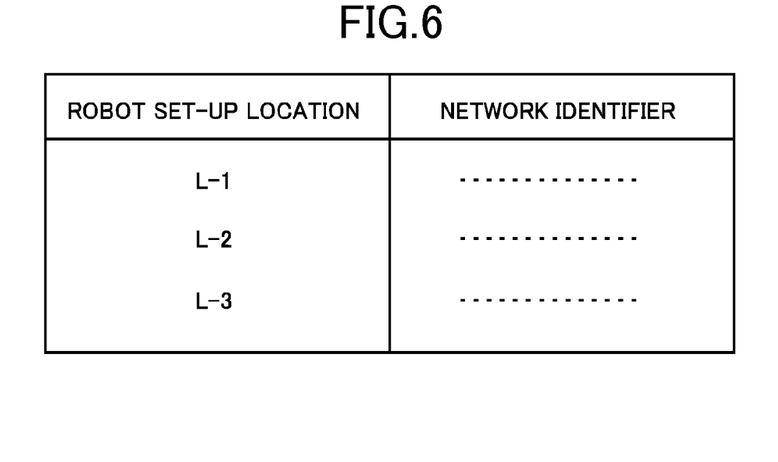
FIG. 6 is a table schematically showing an example of a robot set-up location table.

The work environment data area 102b stores three-dimensional model data of each work piece 34, parts (not shown) attached to the work piece 34, the work table 38, and the like, a robot set-up location table, and the relative positions in design of the work tables 38 relative to the set-up locations of the robots 30A, 30B, and 30C (position measurement data). There is a chance that the actual relative positions of the respective worktables 38 relative to the robots 30A, 30B, and 30C, which are set up manually and arbitrarily in robot set-up locations, differ from their relative positions in design. The relative position in design of each work table 38 is stored in association with each robot set-up location. The robot set-up location table is a table in which, for each robot set-up location, the network identifier of one of the network devices 18A, 18B, and 18C that is set up in the robot set-up location is written in association with the robot set-up location as shown in FIG. 6.

Figure 7:
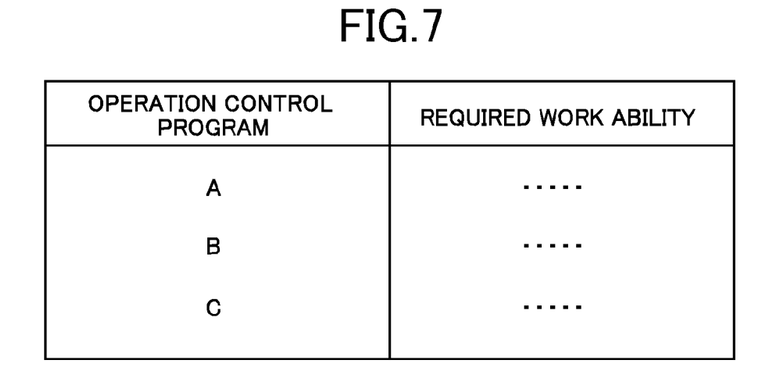
FIG. 7 is a table schematically showing an example of a required work ability table.

The operation control program area 102c stores the substance of the operation control programs executed in the robot controllers 20A, 20B, and 20C, a required work ability table, and a calibration program (described later) for measuring the actual relative positions of the work tables 38 relative to the set-up locations of the robots 30A, 30B, and 30C. The required work ability table is a table in which, for each operation control program, a robot's work ability necessary to execute the program is written in association with the name or other types of identification information of the program as shown in FIG. 7. The required work ability, too, can be expressed by, for example, the type of a tool attached to the tip of an arm of the robot 30A, 30B, or 30C, the arm count, the joint count, or the size or power of the robot 30A, 30B, or 30C. The required work ability may include information that indicates the product type of the robot 30A, 30B, or 30C which is identified by a robot ID, for example.

Figure 8:
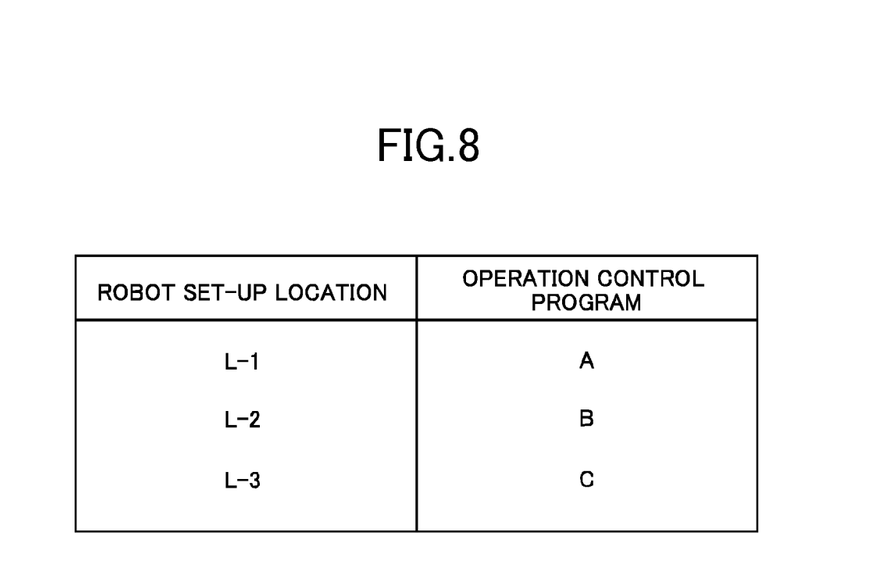
FIG. 8 is a table schematically showing an example of work specifics data.

The work specifics data area 102d stores work specifics data. The work specifics data is data in which, for each of the set-up locations of the robots 30A, 30B, and 30C, which operation control program is to control the robot is written in association with the set-up location as shown in FIG. 8.

The control unit 104 includes, as illustrated in FIG. 2, a robot information receiving unit 104a, an operation control program transmitting unit 104b, a work ability determining unit 104c, a position measurement data transmitting unit 104d, a recovery control program generating unit 104e, a recovery control program transmitting unit 104f, a production management computer informing unit 104g, and a characteristics generating part 104h. These are functions implemented by executing programs in the control unit 104, which is constructed mainly from a CPU.

The robot information receiving unit 104a receives robot IDs as identification information of the robots 30A, 30B, and 30C, and set-up location information about the robots' set-up locations. In this embodiment, the network devices 18A, 18B, and 18C transmit their network identifiers as the set-up location information to the robot management computer 100 in response to the connecting of the robot controllers 20A, 20B, and 20C to the network devices 18A, 18B, and 18C. The network devices 18A, 18B, and 18C also transmit to the robot management computer 100 robot IDs that are stored in the robot controllers 20A, 20B, and 20C. The robot information receiving unit 104a receives these pieces of information.

The operation control program transmitting unit 104b transmits an operation control program that is associated with a network identifier received by the robot information receiving unit 104a to the relevant one of the robot controllers 20A, 20B, and 20C. Specifically, the operation control program transmitting unit 104b reads a robot set-up location associated with the network identifier out of the robot set-up location table of FIG. 6, and identifies an operation control program that is associated with the robot set-up location from the work specifics data of FIG. 8. The operation control program transmitting unit 104b then reads the identified operation control program out of the operation control program area 102c, and transmits the read program to one of the network devices 18A, 18B, and 18C that is associated with the received network identifier. The network devices 18A, 18B, or 18C transfers the received program to the relevant one of the robot controllers 20A, 20B, and 20C.

The operation control program transmitting unit 104b transmits the operation control program associated with the network identifier to the relevant one of the robot controllers 20A, 20B, and 20C depending on determination made in the work ability determining unit 104c. Specifically, when the work ability determining unit 104c determines that the work ability of one of the robots 30A, 30B, and 30C that is identified by a received robot ID is equal to or more than the required work ability of an operation control program that is associated with a received network identifier, the operation control program transmitting unit 104b transmits the operation control program to the relevant one of the robot controllers 20A, 20B, and 20C. When the work ability determining unit 104c determines that the work ability of one of the robots 30A, 30B, and 30C that is identified by a received robot ID is less than the required work ability of an operation control program that is associated with a received network identifier, the operation control program transmitting unit 104b does not transmit the operation control program to the relevant one of the robot controllers 20A, 20B, and 20C. In this case, an alert message may be displayed on the robot controller 20A, 20B, or 20C or the robot management computer 100.

The work ability determining unit 104c determines whether or not one of the robots 30A, 30B, and 30C that is identified by a received robot ID can be controlled with an operation control program that is associated with a received network identifier. Specifically, the work ability determining unit 104c refers to the robot work ability table of FIG. 5 to obtain a piece of work ability data that is associated with the received robot ID. The work ability determining unit 104c further obtains from the required work ability table of FIG. 7 apiece of required work ability data of an operation control program that is about to be transmitted to the relevant one of the robot controllers 20A, 20B, and 20C. The work ability determining unit 104c compares the two pieces of data to determine whether or not the robot 30A, 30B, or 30C identified by the received robot ID can be controlled with the operation control program associated with the received network identifier.

The position measurement data transmitting unit 104d transmits a piece of position measurement data that is associated with a received network identifier to the relevant one of the robot controllers 20A, 20B, and 20C. Specifically, the position measurement data transmitting unit 104d obtains a robot set-up location associated with the received network identifier from the robot set-up location table of FIG. 6, and reads a piece of position measurement data (the relative position of the work table 38 in design) that is associated with the obtained robot set-up location out of the work environment data area 102b. The position measurement data transmitting unit 104d further reads a calibration program out of the operation control program area 102c, and transmits these to the relevant one of the robot controllers 20A, 20B, and 20C. This enables the robot controller 20A, 20B, or 20C to measure the actual relative position of the work table 38.

When there is an anomaly in one of the robots 30A, 30B, and 30C, the recovery control program generating unit 104e generates, by computing, recovery control programs for changing the current postures of the robots 30A, 30B, and 30C to a given standby posture. The given standby posture is defined in advance as described above. The recovery control program generating unit 104e may generate the recovery control programs based on three-dimensional model data of the robots 30A, 30B, and 30C which is stored in the robot data area 102a. For instance, the recovery control program generating unit 104e may use the three-dimensional model data of the robots 30A, 30B, and 30C to execute an interference check for checking whether or not operating the robots 30A, 30B, and 30C on interim recovery control programs generated interferes with other objects. It is more favorable if three-dimensional model data of the relevant work piece 34, parts attached to the work piece 34, the relevant work table 38, and the like which is stored in the work environment data area 102b is additionally used in the interference check.

The recovery control program generating unit 104e may determine the current postures of the robots 30A, 30B, and 30C based on the current states of all joints (the degrees by which the joint is rotated) of the robots 30A, 30B, and 30C which are received from the robot controllers 20A, 20B, and 20C. Alternatively, the recovery control program generating unit 104e may determine the current postures of the robots 30A, 30B, and 30C based on stopping places where the operation control programs are brought to a halt (program counter values) which are received from the robot controllers 20A, 20B, and 20C. In other words, the recovery control program generating unit 104e may obtain, by simulation, postures in which the robots 30A, 30B, and 30C would be if the operation control programs were executed until the received stopping places were reached.

When a recovery control program is generated by the recovery control program generating unit 104e, the recovery control program transmitting unit 104f transmits the generated program to the relevant one of the robot controllers 20A, 20B, and 20C.

The production management computer informing unit 104g receives, from the robot controllers 20A, 20B, and 20C, operation specifics data about the specifics of operations performed on the work pieces 34 respectively by the robots 30A, 30B, and 30C at work, and the robot IDs of the robots 30A, 30B, and 30C, and transmits the received data and robot IDs to the production management computer 200. When transmitting the data and robot IDs, the production management computer informing unit 104g also transmits robot set-up locations associated with the robot IDs to the production management computer 200.

The characteristics generating unit 104h generates operation specifics data characteristics based on operation specifics data related to a plurality of work pieces 34. For instance, the characteristics generating unit 104h generates the trend of changes in an individual value that is included in operation specifics data related to a large number of work pieces 34, or generates a statistical value such as an average value. The generated characteristics may be output to a display device or a printing device by the robot management computer 100, or may be transmitted to the production management computer 200 to be output to a display device or a printing device by the production management computer 200.

Figure 3:
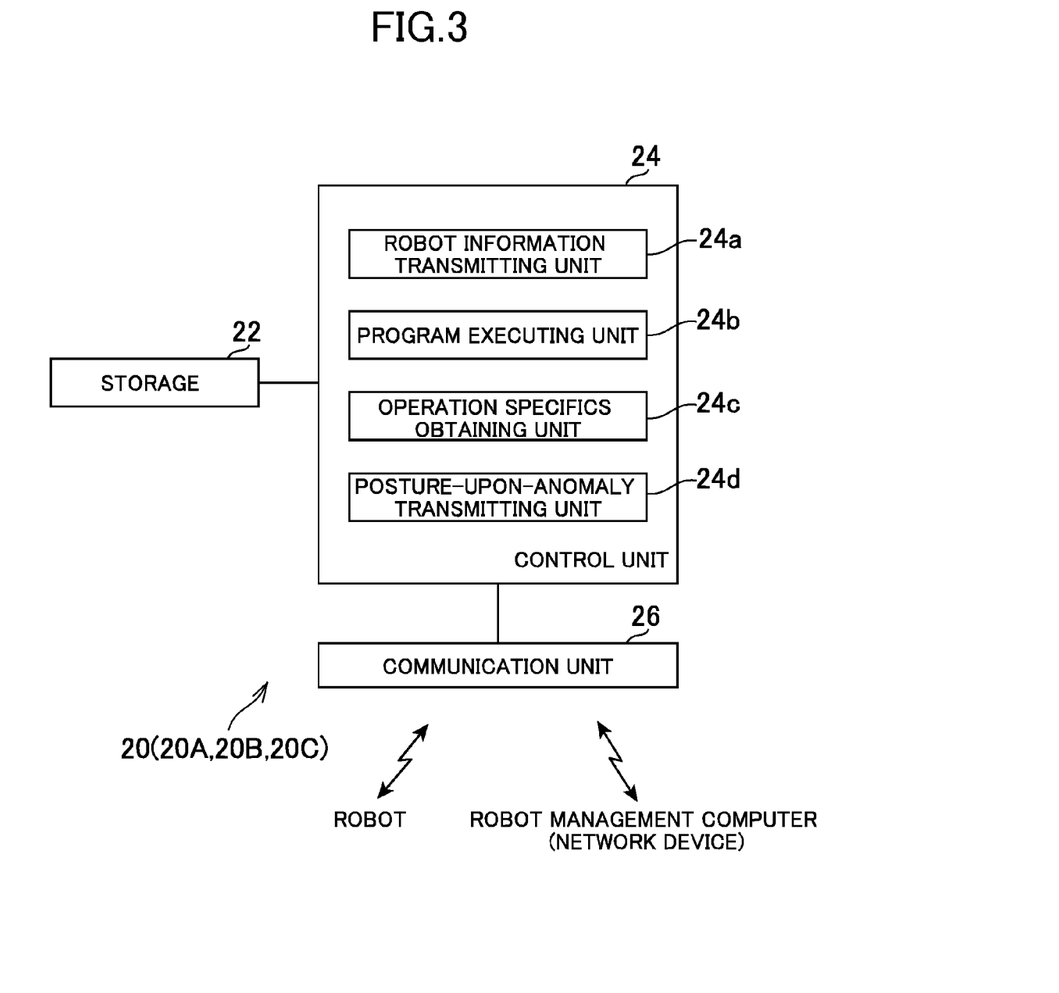
FIG. 3 is a configuration diagram of a robot controller.

FIG. 3 is a configuration diagram of the robot controller 20A. Although the robot controller 20A is described here, the description applies to the robot controllers 20B and 20C as well. The robot controller 20A includes a storage 22, which is a hard disk, a semiconductor memory, and the like, a control unit 24, which is constructed mainly from a CPU, and a communication unit 26, which is for holding communication to and from the robot 30A and the network device 18A. The storage 22 stores a robot ID for identifying the robot 30A. The control unit 24 includes a robot information transmitting unit 24a, a program executing unit 24b, an operation specifics obtaining unit 24c, and a posture-upon-anomaly transmitting unit 24d. These are functions implemented by executing programs in the control unit 24, which is constructed mainly from a CPU.

The robot information transmitting unit 24a transmits the robot ID for identifying the robot 30A to the robot management computer 100 in response to the connecting of the robot controller 20A to the network device 18A. When the robot 30A works on the work piece 34 put on the work table 38 that is a work space of the robot 30A, the robot information transmitting unit 24a transmits the robot ID for identifying the robot 30A to the production management computer 200 via the production management computer informing unit 104g of the robot management computer 100. The transmission of the robot ID can be executed at any point in time after the work piece 34 is conveyed to the space in front of the robot 30A and before the next work piece 34 is conveyed to the space in front of the robot 30A.

When transmitting the robot ID, the robot information transmitting unit 24a also transmits operation specifics data that is about work performed by the robot 30A on the work piece 34. The operation specifics data includes values of various sensors provided in the robot 30A at work. The operation specifics data also includes the relative positions of objects (the work piece 34 and parts of the work piece 34) within the perimeter of the work table 38 relative to the robot 30A at work. In other words, the robot 30A has a function of correcting the arm tip working position of the robot 30A to the actual positions of those objects with outputs of a camera, a contact sensor, and others that are provided at the tip of an arm of the robot 30A as a guide, so that gripping an object within the perimeter of the work table 38, attaching an object to another object, and other types of work are conducted accurately. Meanwhile, the robot controller 20A is keeping track of the state of each joint in an arm of the robot 30A in real time. Based on the state of each joint, the robot controller 20A computes in real time the arm tip working position that is viewed from the position of the robot 30A, namely, the relative arm tip position. The relative arm tip position indicates the relative position of the robot 30A at work relative to objects (the work piece 34 and parts of the work piece 34) within the perimeter of the work table 38. The robot information transmitting unit 24a transmits the thus obtained relative positions to the production management computer 200 via the production management computer informing unit 104g of the robot management computer 100. In the case where an object within the perimeter of the work table 38 is deviated from a position that the type of the object is supposed to be in relative to the robot 30A, there is a chance that the object has a different shape, and information of the relative position described above serves as very important information in production management of the object.

The program executing unit 24b executes an operation control program transmitted from the operation control program transmitting unit 104b of the robot management computer 100. The operation control program is a program in which, for each of actuators provided in places along an arm of the robot 30A, what movement the actuator is to make is written in relation to the output of a camera or a contact sensor that is provided at the arm tip of the robot 30A, or the output of a timer. Executing the operation control program causes the robot controller 20A to transmit control commands sequentially to the robot 30A, thereby controlling the operation of the robot 30A. The program executing unit 24b also executes a calibration program which is transmitted from the position measurement data transmitting unit 104d of the robot management computer 100. The calibration program is a program for measuring the actual relative positions of the work tables 38 relative to the set-up locations of the robots 30A, 30B, and 30C. The calibration program causes the tip of an arm of the robot 30A to move to a relative position indicated by position measurement data (the relative position in design of the work table 38 relative to the robot 30A), and then move further so as to match a characteristic place on the work table 38 with the output of a camera or a contact sensor that is provided at the arm tip as a guide. Based on the state of each joint in the arm at this point, the relative position of the characteristic place on the work table 38 is computed as well. This serves as the actual relative position (does not always match the relative position in design) of the work table 38.

The operation specifics obtaining unit 24c obtains operation specifics data that indicates, for each work piece 34, the specifics of an operation performed on the work piece 34 by the robot 30A at work. The operation specifics data includes, as described above, values of various sensors that are provided in the robot 30A at work. The operation specifics data also includes the relative positions of objects within the perimeter of the work table 38 relative to the robot 30A during work.

The posture-upon-anomaly transmitting unit 24d detects an anomaly in the robot 30A. For instance, in the case where a gripping failure occurs in a robot hand attached to the tip of an arm of the robot 30A, the posture-upon-anomaly transmitting unit 24d determines from the output of a sensor in the robot hand that a gripping failure has occurred. The posture-upon-anomaly transmitting unit 24d obtains information indicating the current posture of the robot 30A when an anomaly occurs in the robot 30A, and transmits the obtained information to the robot management computer 100.

Figure 4:
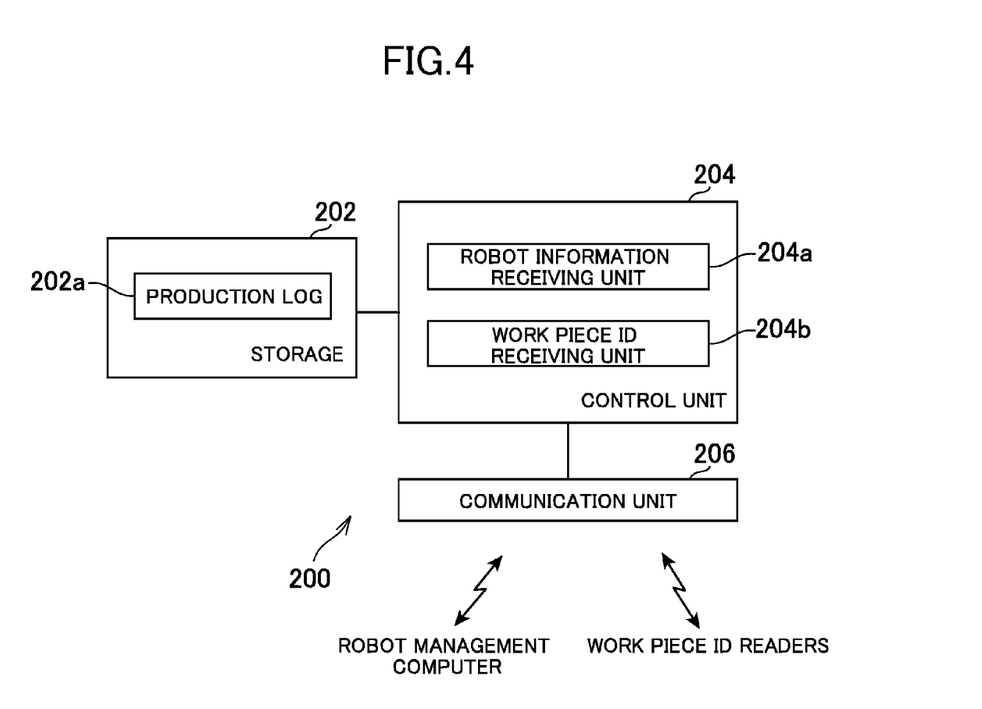
FIG. 4 is a configuration diagram of a production management computer.
Figure 9:
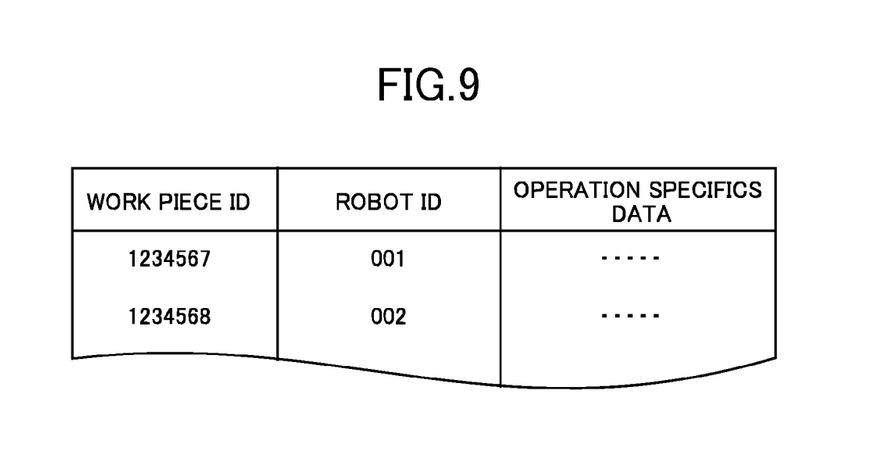
FIG. 9 is a table schematically showing an example of a production log.

FIG. 4 is a configuration diagram of the production management computer 200. The production management computer 200 includes storage 202, which is a hard disk, a semiconductor memory, and the like, a control unit 204, which is constructed mainly from a CPU, and a communication unit 206, which is a network adapter or the like for holding communication to and from the robot management computer 100 and the work piece ID readers 32A, 32B, and 32C. The storage 202 stores a production log 202a. The production log 202a is a log in which a work piece ID, a robot ID, and a piece of operation specifics data are stored in association with one another as shown in FIG. 9. This enables one to find out later what operation has specifically been performed on which work piece 34 by which robot, and can be put to use in various types of production management.

The control unit 204 includes a robot information receiving unit 204a and a work piece ID receiving unit 204b. These are functions implemented by executing programs in the control unit 204, which is constructed mainly from a CPU. The robot information receiving unit 204a receives robot IDs, operation specifics data, and robot set-up locations that are transmitted from the production management computer informing unit 104g of the robot management computer 100. The work piece ID receiving unit 204b receives, when the work pieces 34 of the robots 30A, 30B, and 30C are switched, work piece IDs for identifying the work pieces 34 in question and robot set-up locations from the work piece ID readers 32A, 32B, and 32C. The work piece ID readers 32A, 32B, and 32C can read work piece IDs and transmit the read IDs to the production management computer 200 at any point in time after the work pieces 34 of the robots 30A, 30B, and 30C are placed in front of the robots 30A, 30B, and 30C and before the next work pieces 34 are placed. The work piece ID readers 32A, 32B, and 32C store robot set-up locations that correspond to the set-up locations of the work piece ID readers 32A, 32B, and 32C, and transmit the robot set-up locations along with the work piece IDs to the production management computer 200. The control unit 204 associates a robot ID and operation specifics data received by the robot information receiving unit 204a and a work piece ID received by the work piece ID receiving unit 204b that share the same robot set-up location with each other, and stores the associated robot ID, operation specifics data, and work piece ID in the storage 202 as a part of the production log 202a.

Figure 10:
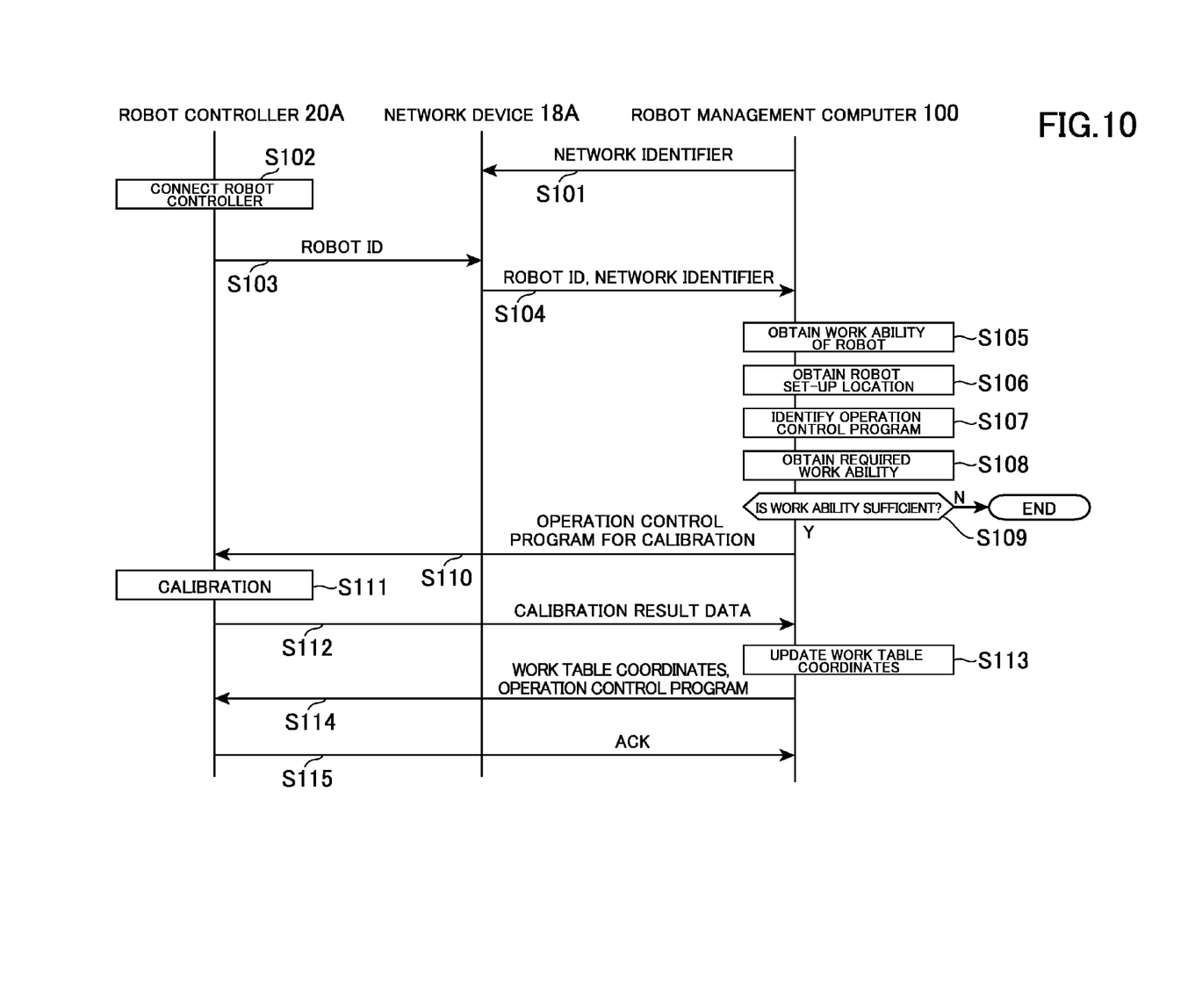
FIG. 10 is a diagram illustrating the operation of the robot system that is performed when a robot is set up or relocated.

FIG. 10 is a diagram illustrating the operation of the robot system 10 that is performed when the robot controller 20A is connected to the network device 18A as the robot 30A is newly set up or relocated. Although the operation of the robot system 10 is described here taking the case of the robot 30A as an example, the description also applies to the cases of the robots 30B and 30C.

As illustrated in FIG. 10, the robot management computer 100 broadcasts the network identifier of the robot management computer 100 over the robot network 40 (Step S101), and the network device 18A knows the network identifier of the robot management computer 100 in advance. When the robot 30A is set up in one of robot set-up locations by the side of the conveying apparatus 36 and the robot controller 20A is connected to the network device 18A which is set up in the vicinity in advance (Step S102), the robot information transmitting unit 24a of the robot controller 20A reads a robot ID out of the storage 22 and transmits the robot ID to the network device 18A (Step S103). The network device 18A pairs the received robot ID with a network identifier stored in the network device 18A, and transmits the pair to the robot management computer 100 (Step S104).

In the robot management computer 100, the robot information receiving unit 104a receives the robot ID and the network identifier, and the work ability determining unit 104c obtains a work ability that is associated with the robot ID from the robot work ability table of FIG. 5 (Step S105). The operation control program transmitting unit 104b obtains a robot set-up location that is associated with the network identifier from the robot set-up location table of FIG. 6 (Step S106). At this point, the robot set-up location and the received robot ID are stored in association with each other in the storage 102. This enables the robot management computer 100 to directly obtain a robot set-up location based on a robot ID from then on.

The operation control program transmitting unit 104b also identifies an operation control program that is associated with the robot set-up location from the work specifics data of FIG. 8 (Step S107). Next, the work ability determining unit 104c reads a required work ability that is associated with the operation control program identified in Step S107 out of the required work ability table of FIG. 7 (Step S108), and compares the work ability obtained in Step S105 with the required work ability obtained in Step S108 (Step S109). The processing is terminated in the case where the work ability of the robot 30A cannot be controlled with the operation control program identified in Step S107. In this case, the robot controller 20A or the robot management computer 100 desirably displays that fact.

In the case where the work ability of the robot 30A can be controlled with the operation control program identified in Step S107, the position measurement data transmitting unit 104d reads a calibration program out of the operation control program area 102c and also reads position measurement data out of the work environment data area 102b to transmit the read program and data to the robot controller 20A via the network device 18A (Step S110). The program executing unit 24b of the robot controller 20A executes the calibration program, thereby measuring the actual relative position of the work table 38 in question, and transmits calibration result data which is the result of the measurement to the robot management computer 100 via the network device 18A. The robot management computer 100 updates the relative position of the work table 38 that has been stored in association with the robot set-up location in the storage 102 (Step S113). Thereafter, the operation control program transmitting unit 104b transmits the operation control program identified in Step S107 and the latest relative position of the work table 38 updated in Step S113 to the robot controller 20A (Step S114). In the case where these are received normally without a trouble, the robot controller 20A sends a reception confirmation to the robot management computer 100 in response (Step S115).

Figure 11:
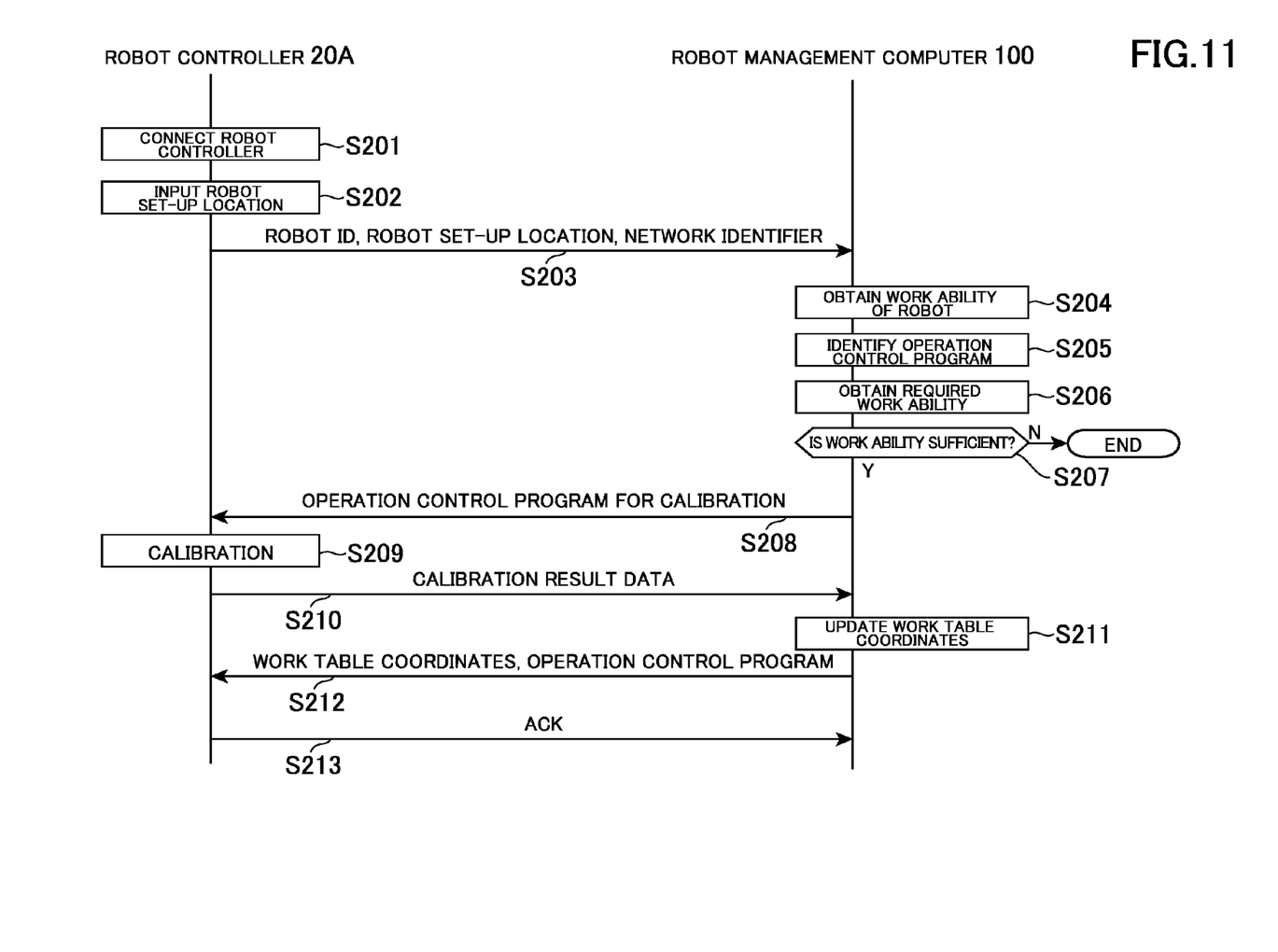
FIG. 11 is a diagram illustrating a modification example of the operation of the robot system that is performed when a robot is set up or relocated.

In the description given above, the network device 18A is set up in advance in a place where a robot is expected to be set up, and the robot controller 20A accesses the robot network 40 via the network device 18A. The robot controller 20A may instead access the robot network 40 directly by building a network function in the robot controller 20A. FIG. 11 is a diagram illustrating a modification example of the operation of the robot system 10 that is performed when the robot 30A is newly set up or relocated. The robot controller 20A according to the modification example has an input device such as a keyboard, a touch panel, or a DIP switch which enables an administrator to input a set-up location of the robot 30A. The robot controller 20A also stores a unique network identifier.

When the robot controller 20A is connected to the robot network 40 (Step S201), the administrator next input a set-up location of the robot 30A (Step S202). For instance, the administrator inputs information such as "L-1", "L-3", and "L-3" which are identification information of robot set-up locations as is the case for robot set-up locations of FIG. 8. Thereafter, the robot controller 20A transmits to the robot management computer 100 a robot ID, the input robot set-up location, and the network identifier stored in advance.

In the robot management computer 100, the robot information receiving unit 104a receives the robot ID, the robot set-up location, and the network identifier. The robot set-up location and the received robot ID are stored in association with each other in the storage 102 at this point. This enables the robot management computer 100 to directly obtain a robot set-up location based on a robot ID from then on. Next, the work ability determining unit 104c of the robot management computer 100 obtains a work ability that is associated with the robot ID from the robot work ability table of FIG. 5 (Step S204). The operation control program transmitting unit 104b identifies an operation control program that is associated with the robot set-up location from the work specifics data of FIG. 8 (Step S205). The work ability determining unit 104c then reads a required work ability that is associated with the operation control program identified in Step S205 from the required work ability table of FIG. 7 (Step S206), and compares the work ability obtained in Step S204 with the required work ability obtained in Step S206 (Step S207). The subsequent operation of the robot system 10 which varies depending on the result of the comparison is the same as in FIG. 10, and a detailed description thereof is omitted here. Loading an appropriate operation control program that is suited to the robot set-up location into the robot controller 20A is accomplished in this manner, too.

Figure 12:
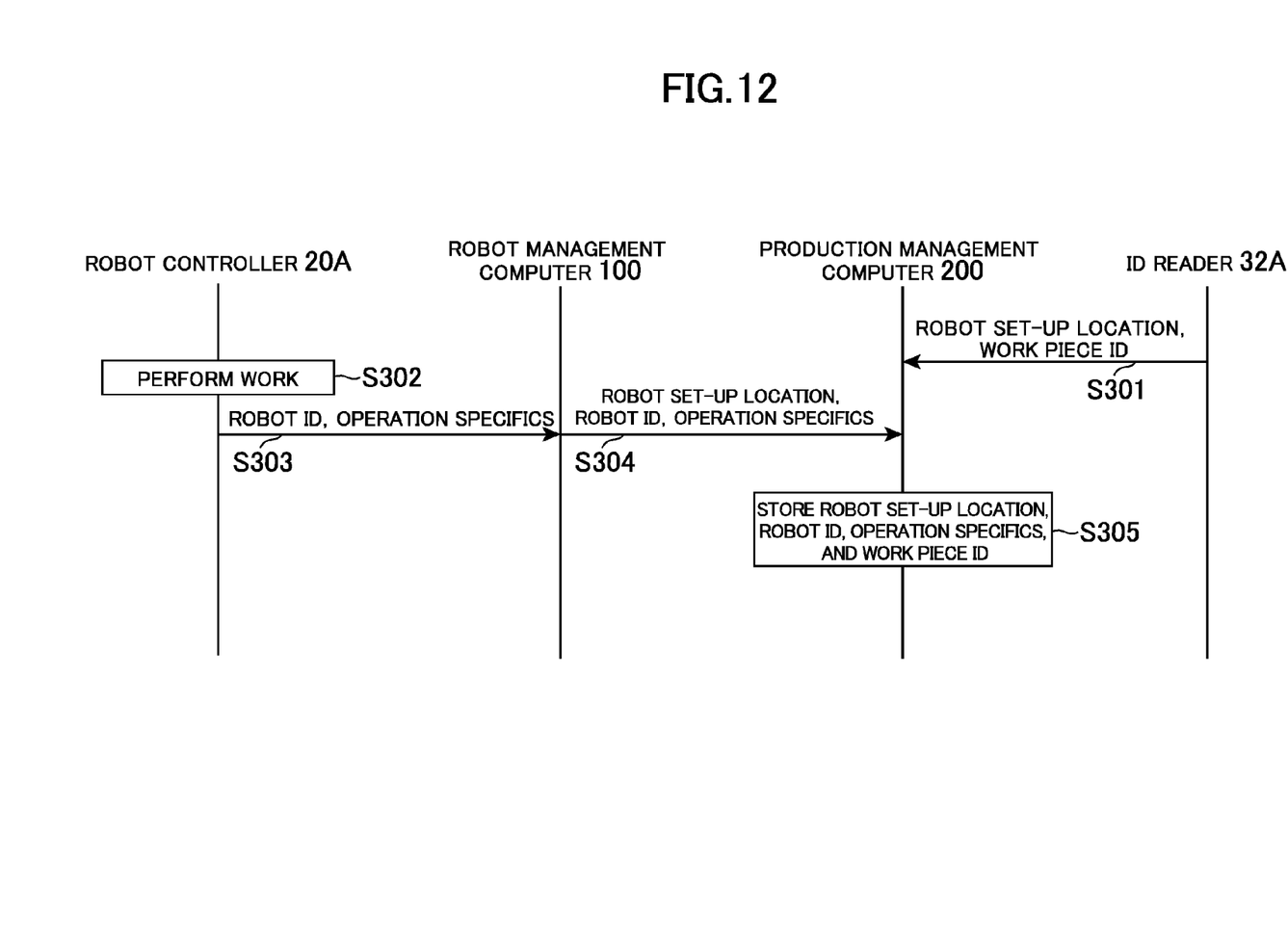
FIG. 12 is a diagram illustrating the operation of the robot system that is performed during work.

FIG. 12 is a diagram illustrating the operation of the robot system 10 that is performed during work. When a new work piece 34 is conveyed to the space in front of the robot 30A, the work piece ID reader 32A reads a bar code attached to the work piece 34 or its work table 38 to obtain a work piece ID. The work piece ID reader 32A then transmits a robot set-up location that corresponds to the location of the work piece ID reader 32A and the obtained work piece ID to the production management computer 200 (Step S301). Meanwhile, the program executing unit 24b of the robot controller 20A executes an operation control program when a new work piece 34 is conveyed to the space in front of the robot 30A, and performs work on the work piece 34 (Step S302). The operation specifics obtaining unit 24c generates operation specifics data of the robot 30A in the interim. After the operation control program is finished in a normal manner, the robot information transmitting unit 24a transmits the robot ID and operation specifics data of the robot 30A to the robot management computer 100 (Step S303). The production management computer informing unit 104g of the robot management computer 100 obtains a robot set-up location that is associated with the received robot ID, and transmits the robot ID and the operation specifics data along with the robot set-up location to the production management computer 200 (Step S304). The robot information receiving unit 204a of the production management computer 200 receives the thus transmitted robot ID, operation specifics data, and robot set-up location, and the work piece ID receiving unit 204b receives the work piece ID and the robot set-up location. The control unit 204 of the production management computer 200 stores, in the storage 202, as a part of the production log 202a, the robot ID-operation specifics data pair and the work piece ID that have been received along with a shared robot set-up location, in association with each other (Step S305). The processing described above is executed each time a new work piece 34 is conveyed to the space in front of the robot 30A.

Figure 13:
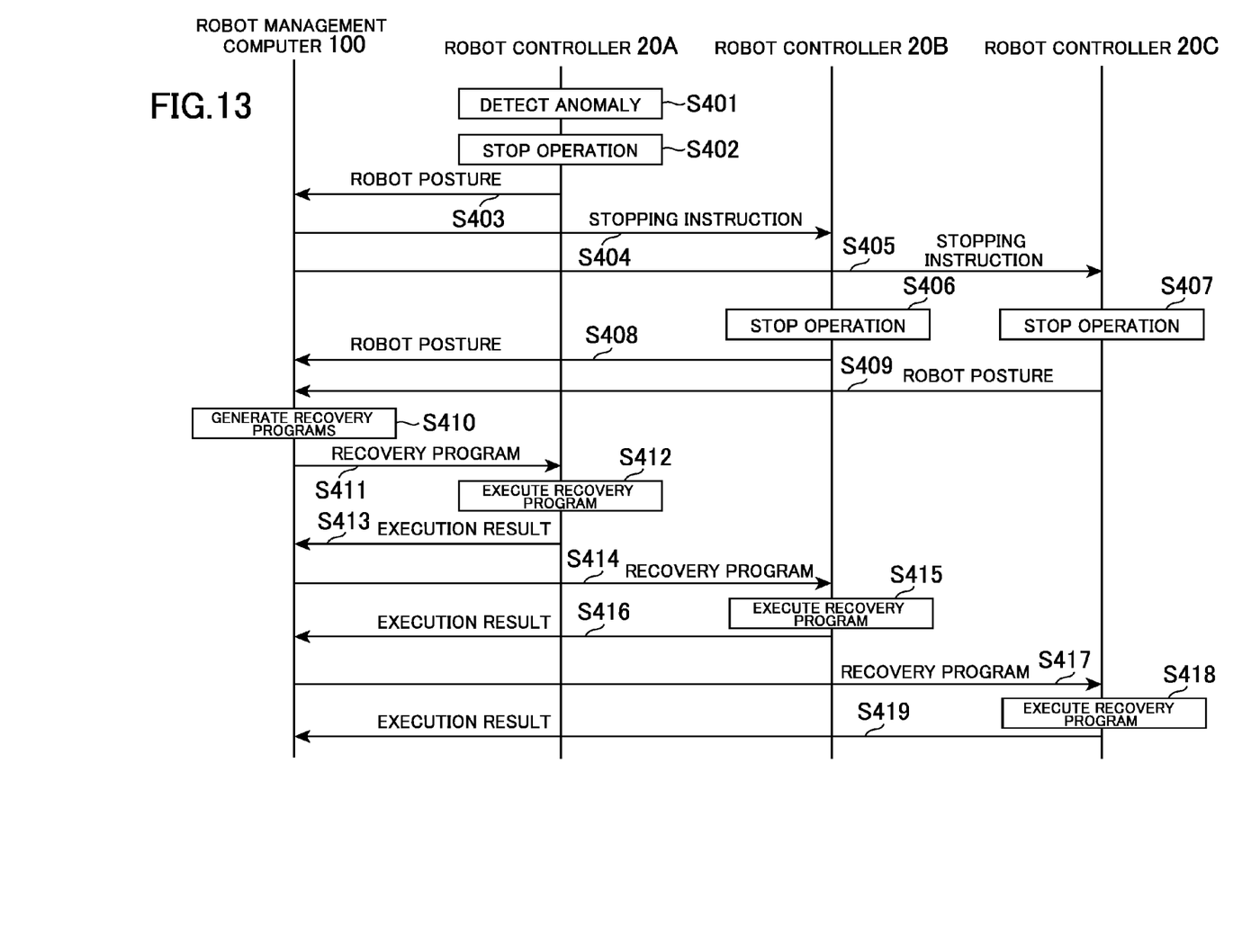
FIG. 13 is a diagram illustrating the operation of the robot system that is performed in the event of an anomaly.

FIG. 13 is a diagram illustrating the operation of the robot system 10 that is performed in the event of an anomaly. Described here is how the robot system 10 operates in the case where an anomaly occurs in the robot 30A. However, the description also applies to the case where an anomaly occurs in the robot 30B and the case where an anomaly occurs in the robot 30C. When detecting an anomaly from the outputs of various sensors provided in the robot 30A (Step S401), the robot controller 20A brings the robot 30A to a halt (Step S402). The robot controller 20A may stop the robot 30A immediately, or may stop the robot 30A after continuing the execution of an operation control program until an execution place set in the operation control program in advance is reached. Thereafter, the posture-upon-anomaly transmitting unit 24d of the robot controller 20A transmits the posture of the robot to the robot management computer 100 (Step S403). In response to this, the robot management computer 100 instructs the robot controllers 20B and 20C to stop the robots 30B and 30C (Steps S404 and S405). The robot controllers 20B and 20C stop the robots 30B and 30C, respectively, in response to the instruction (Steps S406 and S407). When the robot 30B and 30C stop, the robot controllers 20B and 20C respectively transmit postures of the robots 30B and 30C to the robot management computer 100 (Steps S408 and S409).

Thereafter, the recovery control program generating unit 104e of the robot management computer 100 generates recovery control programs to be executed respectively in the robot controllers 20A, 20B, and 20C (Step S410). Specifically, the recovery control program generating unit 104e obtains the current postures of the robots 30A, 30B, and 30C and their respective standby positions. The recovery control program generating unit 104e then generates, for each of the robots 30A, 30B, and 30C, by computing, an interim operation control program for changing the current posture to the standby position (recovery control program). At this point, the recovery control program generating unit 104e also determines an interim order in which the robots 30A, 30B, and 30C are returned to the standby positions. The recovery control program generating unit 104e further simulates movement that the robots 30A, 30B, and 30C are expected to make in a work space when operations in accordance with the recovery control programs are actually performed in order. The simulation uses three-dimensional model data of the robots 30A, 30B, and 30C, the work pieces 34, the work tables 38, and the like. Specifically, a known virtual reality technology is used to let the robots 30A, 30B, and 30C operate in order in a virtual space, and whether the operation of one robot interferes with other objects is examined for each robot. To describe in more detail, when the robot 30A performs a recovery operation virtually, the robots 30B and 30C maintain their current postures. When the robot 30A finishes the recovery operation without interfering with other objects, the robot 30B next performs a recovery operation virtually while the robot 30A maintains a standby posture and the robot 30C maintains its current posture. When the robot 30B finishes the recovery operation without interfering with other objects, the robot 30C lastly performs a recovery operation virtually while the robots 30A and 30B maintain the standby postures. In the case where an interference with other objects occurs at any one of the stages, the order in which the robots are returned to their standby postures is changed and then the same processing is repeated. Operation control programs for recovery operations that do not interfere with others are generated in this manner, and are transmitted to the robot controllers 20A, 20B, and 20C.

For example, in the case where recovery control programs in which the robots 30A, 30B, and 30C are returned to their standby postures in the order stated are generated successfully, the recovery control program transmitting unit 104f first transmits relevant one of the recovery control programs to the robot controller 20A (Step S411), and the program executing unit 24b of the robot controller 20A executes the received recovery control program (Step S412). In the case where the execution of the program is finished in a normal manner, the robot controller 20A transmits the result of the execution to the robot management computer 100 (Step S413).

Receiving the execution result, the recovery control program transmitting unit 104f next transmits relevant one of the recovery control programs to the robot controller 20B (Step S414), and the program executing unit 24b of the robot controller 20B executes the received recovery control program (Step S415). In the case where the execution of the program is finished in a normal manner, the robot controller 20B transmits the result of the execution to the robot management computer 100 (Step S416). The robot controller 20C, too, executes relevant one of the recovery control programs in the same manner (Steps S417 to S419).

According to the robot system 10 described above, when the robots 30A, 30B, and 30C are arranged at given set-up locations and the robot controllers 20A, 20B, and 20C are connected to the network devices 18A, 18B, and 18C and to the robot network 40 as a robot is newly set up or relocated, the robot management computer 100 transmits operation control programs to be executed in the robot controllers 20A, 20B, and 20C to the robot controllers 20A, 20B, and 20C. This enables the robot controllers 20A, 20B, and 20C to control the robots 30A, 30B, and 30C to execute given operations without fail.

In the event of an anomaly in one of the robots 30A, 30B, and 30C, the robot management computer 100 stops the other two robots out of the robots 30A, 30B, and 30C, and recovery control programs for bringing the robots 30A, 30B, and 30C to a given standby posture in order are generated respectively and automatically. The robot controllers 20A, 20B, and 20C can therefore execute recovery control programs without needing to include large-capacity storage devices as components of the robot controllers 20A, 20B, and 20C.

While the robot management computer 100 generates recovery control programs here, the robot controllers 20A, 20B, and 20C may generate their own recovery control programs. However, charging the robot management computer 100 which is a separate component from the robot controllers 20A, 20B, and 20C with the computing of recovery control programs has the merit of accomplishing quick computing at low cost. Another advantage of generating recovery control programs in the robot management computer 100 is that, because the current postures of a plurality of robots 30A, 30B, and 30C can be taken into consideration in the generation of recovery control programs, avoiding interference among robots is accomplished with more accuracy.

According to the robot system 10, where the production management computer 200 stores a work piece ID, a robot ID, and a piece of operation specifics data in association with one another, the information can be put to use in production management.

It should be understood by those skilled in the art that various modifications, combinations, sub-combinations and alterations may occur depending on design requirements and other factors insofar as they are within the scope of the appended claim or the equivalents thereof.

What is claimed is:

1. A robot system, comprising:
   a first robot controller for controlling a first robot,
   a second robot controller for controlling a second robot,
   a robot management computer connected to the first robot controller and the second robot controller,
   a first network device connected between the first robot controller and the robot management computer and located at a first set-up location,
   a second network device connected between the second robot controller and the robot management computer and located at a second set-up location,
   wherein the first robot controller comprises a first posture information obtaining unit for obtaining information indicating a posture of the first robot when an anomaly occurs in the first robot, and a first transmitting unit for transmitting the information indicating the posture of the first robot to the robot management computer via the first network device,
   wherein the second robot controller comprises a second posture information obtaining unit for obtaining information indicating a posture of the second robot when an anomaly occurs in the second robot, and a second transmitting unit for transmitting the information indicating the posture of the second robot to the robot management computer via the second network device,
   wherein the first network device comprises a third transmitting unit for transmitting a first network identifier stored in the first network device beforehand and a robot ID read from the first robot controller to the robot management computer,
   wherein the second network device comprises a fourth transmitting unit for transmitting a second network identifier stored in the second network device beforehand and a robot ID read form the second robot controller to the robot management computer,
   wherein the robot management computer comprises a first receiver for receiving the first network identifier and the first robot ID from the first network device, obtaining the first set-up location of the first robot controller associated beforehand with the first network identifier, receiving the second network identifier and the second robot ID from the second network device, and obtaining the second set-up location of the second robot controller associated beforehand with the second network identifier,
   wherein the robot system further comprises a recovery control program generating unit for generating, by computing, based on the postures of the first robot and the second robot, a recovery control program for changing the postures of the first robot and the second robot to respective given standby postures, and executing an interference check by letting the first robot and the second robot operate in order in a virtual space according to the recovery control programs, and
   a program transmitting unit for transmitting the recovery control programs to the first robot controller and the second robot controller.

2. The robot system according to claim 1,
   wherein the robot management computer further comprises:
   a storage for storing three-dimensional model data that indicates three-dimensional shapes of the first robot and the second robot, and wherein the recovery control program generating unit generates the recovery control program based on the three-dimensional model data of the first robot and the second robot.

3. The robot system according to claim 1, wherein the first robot controller controls the posture of the first robot as programmed by an operation control program, wherein a posture information transmitting unit comprised in the first robot controller transmits an execution place in the operation control program to the robot management computer as information indicating the posture of the first robot when an anomaly occurs in the first robot, and wherein the recovery control program generating unit determines the posture of the first robot based on the execution place in the operation control program.

4. A robot management computer, comprising:

a posture information receiving unit for receiving information that indicates a posture of first a robot from first a robot controller which controls the first robot and information that indicates a posture of a second robot from a second robot controller which controls the second robot, when an anomaly occurs in the first robot;

a receiving unit for receiving a first network identifier and a first robot ID from a first network device connected between the first robot controller and the robot management computer, obtaining a first set-up location of the first robot controller associated beforehand with the first network identifier, receiving a second network identifier and a second robot ID from a second network device connected between the second robot controller and the robot management computer, and obtaining a second set-up location of the second robot controller associated beforehand with the second network identifier, a recovery control program generating unit for generating, based on the postures of the first robot and the second robot, recovery control programs for changing the postures of the first robot and the second robot to respective a given standby postures, and executing an interference check by letting the first robot and the second robot operate in order in a virtual space according to the recovery control programs; and a recovery control program transmitting unit for transmitting the generated recovery control programs to the first robot controller and the second robot controller.

5. A method of managing a robot system, comprising:

receiving information that indicates a posture of a first robot from a first robot controller which controls the first robot and information that indicates a posture of a second robot from a second robot controller which controls the second robot, when an anomaly occurs in the first robot;

receiving, by a robot management computer, a first network identifier and a first robot ID from a first network device connected between the first robot controller and the robot management computer, obtaining a first set-up location of the first robot controller associated beforehand with the first network identifier, receiving, by the robot management computer, a second network identifier and a second robot ID from a second network device connected between the second robot controller and the robot management computer, and obtaining a second set-up location of the second robot controller associated beforehand with the second network identifier, generating, based on the postures of the first robot and the second robot, recovery control programs for changing the postures of the first robot and the second robot to respective given standby postures, and executing an interference check by letting the first robot and the second robot operate in order in a virtual space according to the recovery control programs; and transmitting the generated recovery control programs to the first robot controller and the second robot controller.

* * * * *